US012584593B2

(12) United States Patent
Lugari

(10) Patent No.: US 12,584,593 B2
(45) Date of Patent: Mar. 24, 2026

(54) NON-REFILLABLE CYLINDER

(71) Applicants: PI.LU.VIA. SRL, Sant'Ilario d'Enza (IT); EUROTRE S.R.L., Castelnovo di Sotto (IT)

(72) Inventor: Giacomo Lugari, Sant'Ilario d'Enza (IT)

(73) Assignees: PI.LU.VIA. SRL, Sant'Ilario d'Enza (IT); EUROTRE S.R.L., Castelnovo di Sotto (IT)

( * ) Notice: Subject to any disclaimer, the term of this patent is extended or adjusted under 35 U.S.C. 154(b) by 0 days.

(21) Appl. No.: 18/778,494

(22) Filed: Jul. 19, 2024

(65) Prior Publication Data

US 2025/0043921 A1 Feb. 6, 2025

(30) Foreign Application Priority Data

Aug. 4, 2023 (IT) ........................ 102023000016773

(51) Int. Cl.
*F17C 13/04* (2006.01)
*F17C 13/08* (2006.01)

(52) U.S. Cl.
CPC ............ *F17C 13/04* (2013.01); *F17C 13/084* (2013.01); *F17C 2205/0332* (2013.01); *F17C 2205/0335* (2013.01)

(58) Field of Classification Search
CPC ........ F17C 13/06; F17C 13/04; F17C 13/084; F17C 13/08; F17C 2205/0308; F17C 2205/0311; F17C 2205/0332; F17C 2205/0323; F17C 2205/0335; B65D 51/1644; B65D 51/1633; B65D 51/16
USPC ......... 220/586, 581, 203.29, 203.27, 203.23, 220/203.19, 203.01, 367.1
See application file for complete search history.

(56) References Cited

U.S. PATENT DOCUMENTS

| | | | | |
|---|---|---|---|---|
| 3,143,253 A * | 8/1964 | Lindgren | ................ | F17C 13/04 222/545 |
| 3,684,132 A | 8/1972 | Coppens | | |
| 6,932,238 B2 | 8/2005 | Baker | | |
| 9,791,050 B2 | 10/2017 | Muzzo | | |
| 2024/0288128 A1 * | 8/2024 | Brown | .................... | F17C 13/04 |

FOREIGN PATENT DOCUMENTS

| | | |
|---|---|---|
| EP | 0768485 A1 | 4/1997 |
| IT | 202100007097 A1 | 9/2022 |

OTHER PUBLICATIONS

Italian Search Report for IT 202300016773, dated Feb. 13, 2024, 6 pages.

* cited by examiner

*Primary Examiner* — Robert J Hicks
(74) *Attorney, Agent, or Firm* — NIXON & VANDERHYE

(57) ABSTRACT

A non-refillable cylinder that includes a hollow container body designed to hold pressurized gas, with a port for gas release. A one-way valve is securely coupled to the port through a threaded clamping portion. The valve is designed with a specially shaped end that prevents its removal from the container body. The valve is movable between a pressurization position, where it prevents gas leakage, and a safety position, where the valve remains securely in place. Venting features are provided to allow the safe escape of gas from the container when the valve is in the safety position, mitigating risks during damage or tampering.

10 Claims, 3 Drawing Sheets

NON-REFILLABLE CYLINDER

CROSS-REFERENCE TO RELATED APPLICATION

This application claims priority to IT 102023000016773 filed Aug. 4, 2023, the entire contents of which are hereby incorporated by reference.

TECHNICAL FIELD

The present invention relates to a non-refillable cylinder.

BACKGROUND ART

As is well known, a cylinder essentially consists of a hollow container body adapted to hold pressurized gas and of a valve, installed on the container body, configured to allow the gas contained in the container body to escape and, possibly, to introduce gas into the container body itself.

In this regard, it must, in fact, be explained that the cylinder industry mainly comprises two different types of products, namely refillable cylinders and non-refillable cylinders.

As can be easily deduced, the latter are distinguished from the former by their inability to be refilled and, consequently, by some of their peculiar constructional aspects arising from this characteristic.

Specifically, since such cylinders have to undergo one and only one pressurization, they can be provided with container bodies having thinner walls than those of refillable cylinders, thus increasing their gas capacity for the same volume and lowering overall production costs.

A crucially important aspect in the design of non-refillable cylinders is the coupling between the valve and the container body, for which there are specific regulations requiring the implementation of special safety measures to prevent the former from removing from the latter.

These regulations, in fact, require the use of safety systems aimed to prevent the removal and replacement of valves so as to prevent non-refillable cylinders from being reused.

In this regard, a first particularly popular known methodology involves screwing the valve to the container body using high tightening torques and then applying special anti-unscrewing adhesives to the valve.

This first solution does, however, have some limitations, since the external securing by an adhesive is not sufficient to prevent the valve from being removed from the container body.

A second known method of operation consists in the construction of a special valve provided with one end adapted to break off in the event of attempted removal and intended to remain inside the container body, thus preventing other valves from being inserted.

However, even this second method of operation does not guarantee that the cylinder cannot actually be reused, making it possible, however, to insert new, shorter valves.

In addition, the aforementioned method is quite complex to implement and, therefore, even more inconvenient.

A third method of operation consists in the use of special safety systems aimed to prevent the valve from being removed from the container body.

These systems involve the use of special blocking cups which are positioned at the outer portion of the valve and are welded to the container body in such a way as to ensure that the valve itself is blocked in place.

However, this third approach also has significant drawbacks related, in particular, to the fact that the cups are placed externally to the cylinder and, therefore, may be subject to tampering and damage.

Beyond what is required by current regulations, an additional important issue arising from the use of the known solutions just discussed relates to the safety of non-refillable cylinders in the event of voluntary or inadvertent removal of the valves, e.g., in the event of damage during transport.

In fact, if gas is present within the cylinder, voluntary or inadvertent removal of the valve poses a high danger to those in the vicinity, as they could be hit by the valve itself.

In addition, safety issues related to known solutions become apparent during the cylinder disposal procedures.

In these cases, in fact, the implementation of the above solutions, aimed at preventing the removal of the valve, leads to the inability to evacuate any residual gases from the container body, forcing operators to cut the container body itself and to expose themselves, in doing so, to considerable risks due to the sudden release of pressurized gases.

Having said all this, it is also important to explain that the intentional or accidental removal of the valve from the container body and, more generally, the weakening of the coupling seal between them can also be an important safety risk factor for the user if there are residual gases in the container body.

Such weakening may, e.g., occur due to impacts on the cylinder during the manufacturing process and/or transportation, which could expose the cylinder to abnormal stresses that would significantly impair the safe use thereof, thus making its use somewhat dangerous for the user.

Not only that, but the aforementioned weakening can also be caused by attempts to tamper with non-refillable cylinders aimed at replacing the valve thereof, which, by resulting in the sudden release of the pressurized gases from the container body, can give rise to serious dangerous situations for the user.

In the light of the considerations so far, it is clear to see how the need to devise a non-refillable cylinder is particularly felt today wherein the extraction of the valve from the container body is not possible and which is characterized by particularly safe use even in the event of unintentional damage and tampering.

DESCRIPTION OF THE INVENTION

The main aim of the present invention is to devise a non-refillable cylinder which allows ensuring that the valve cannot be removed from the container body, preventing it from being replaced, while at the same time ensuring maximum safety in case of damage or tampering.

Another object of the present invention is to devise a non-refillable cylinder which can overcome the aforementioned drawbacks of the prior art within the framework of a simple, rational, easy and effective to use, as well as inexpensive solution.

The aforementioned objects are achieved by this non-refillable cylinder having the characteristics of claim 1.

BRIEF DESCRIPTION OF THE DRAWINGS

Other characteristics and advantages of the present invention will become more apparent from the description of a preferred, but not exclusive, embodiment of a non-refillable cylinder, illustrated by way of an indicative, yet non-limiting example, in the accompanying tables of drawings wherein.

EMBODIMENTS OF THE INVENTION

Figure 1:
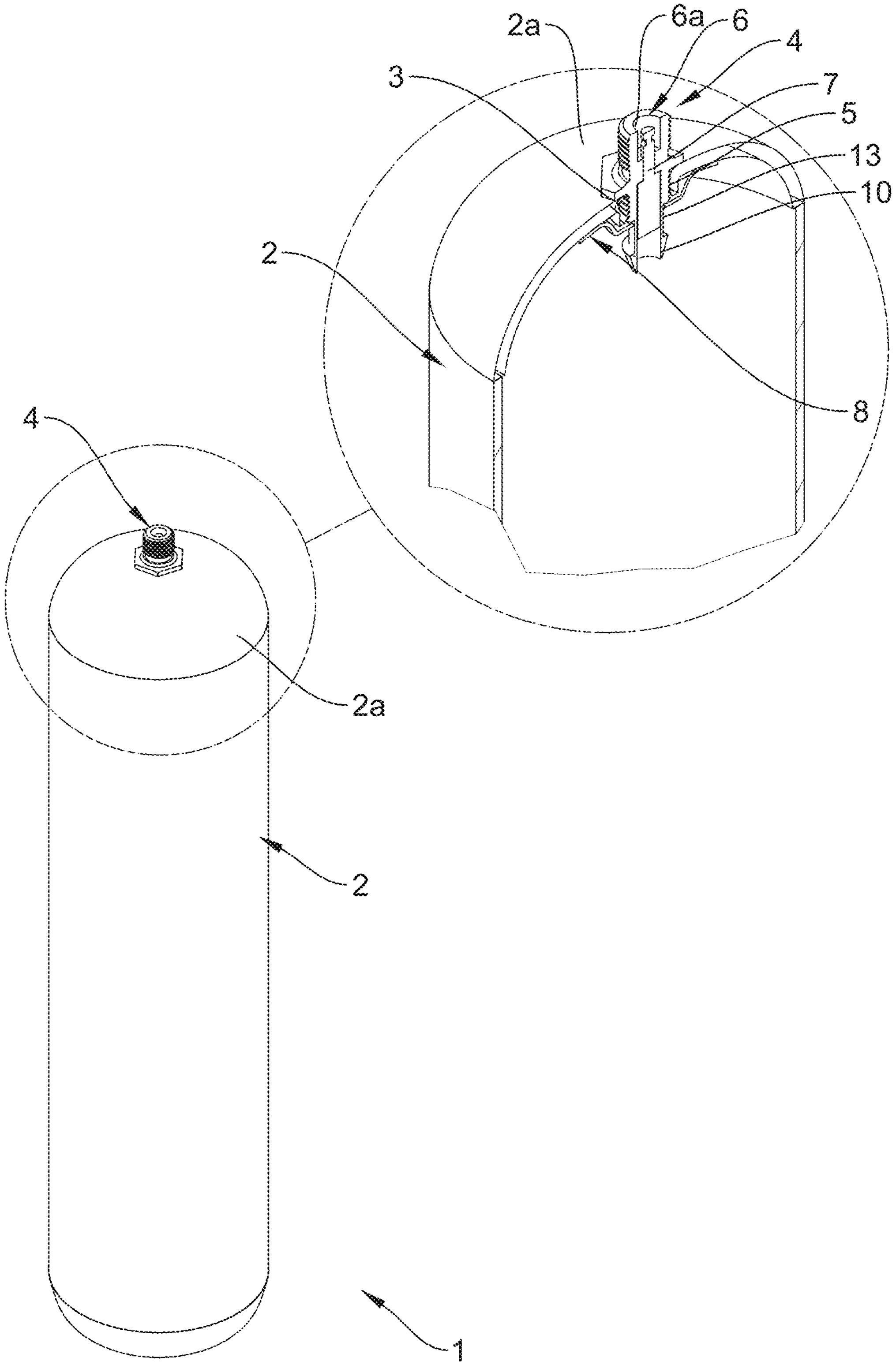
FIG. 1 is an axonometric, overall view of the cylinder according to the invention.

With particular reference to these figures, reference numeral 1 globally denotes a non-refillable cylinder.

First of all, the non-refillable cylinder 1 comprises at least one hollow container body 2 adapted to contain pressurized gas and provided with at least one end portion 2*a* on which at least one port 3 for the gas outflow is obtained.

In particular, the container body 2 is conformed substantially cylindrical.

The cylinder 1 then comprises at least one one-way valve 4 associated with the container body 2, adapted to allow the gas to escape from the container body 2 and provided with at least one threaded clamping portion 5 coupleable to the port 3 in a threaded manner.

In actual facts, the clamping portion 5 is shaped to fit snugly into the port 3 and can, in this way, mate securely thereto to prevent unwanted gas leakage through it.

Figure 5:
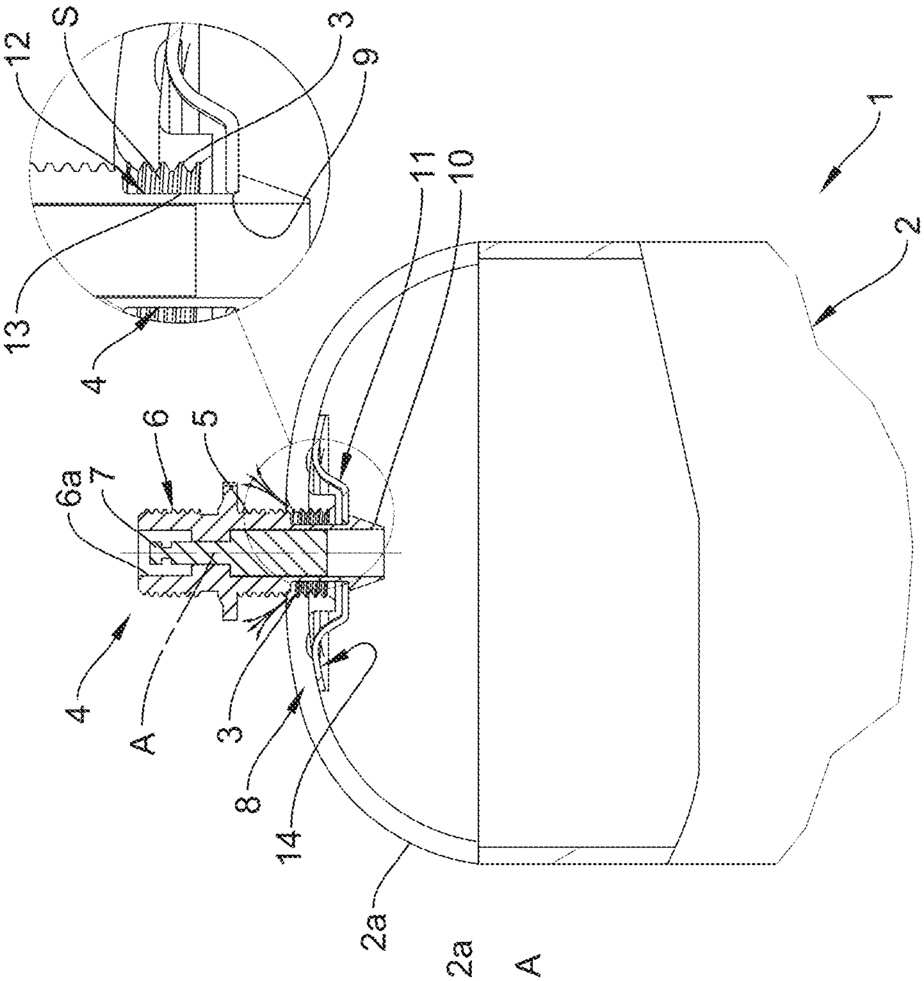
FIGS. 4 and 5 are front, cross-sectional views of the cylinder according to the invention in two different configurations of use.
Figure 4:
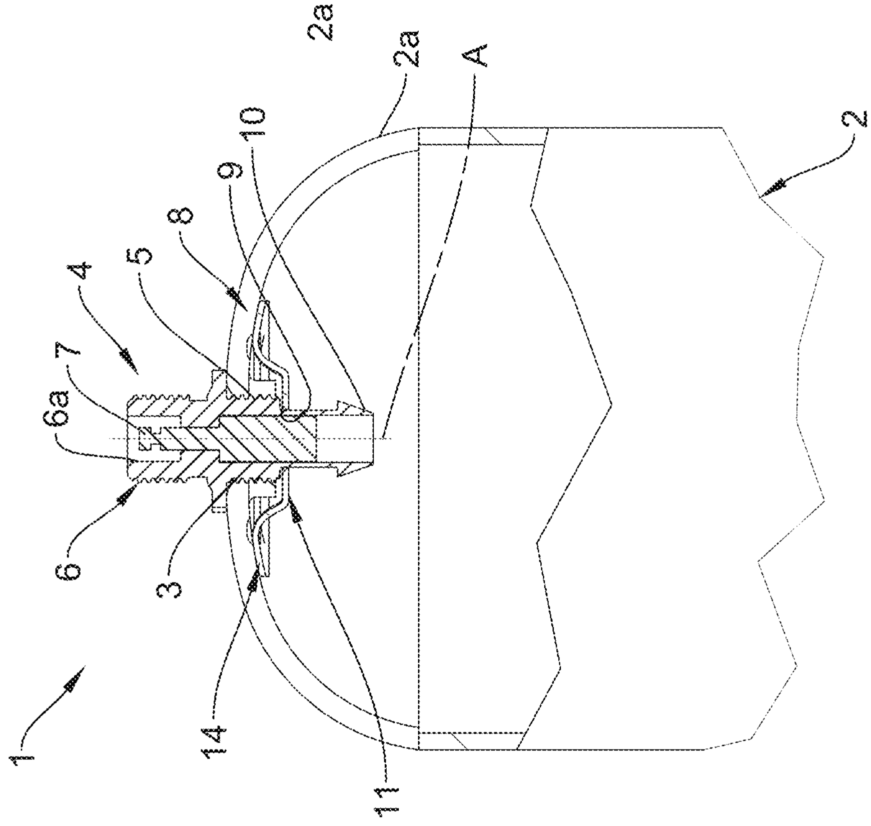

As visible in FIGS. 1, 4 and 5, the valve 4 comprises:

at least one outer body 6 provided with a cavity 6*a* obtained through; and at least one spool 7 fitted into the cavity 6*a* in a movable manner and adapted to allow/prevent the passage of gas through the cavity itself as a result of its own movement with respect to the outer body 6.

Conveniently, the cylinder 1 comprises retaining means 8 associated with the container body 2 and adapted to prevent the valve 4 from being removed from the container body 2.

In this case, the retaining means 8 comprise at least one retaining body 8 arranged internally to the container body 2 where its port 3 is located.

The fact of arranging the retaining body 8 internally within the container body 2 ensures that the same cannot be reached by the user and possibly tampered with, proving to be a particularly advantageous technical expedient to prevent the valve 4 from being removed from the container body 2.

Specifically, the retaining body 8 comprises at least one flexible portion 11 defining a passage hole 9 aligned with the port 3 along an axis A and adapted to house one stretch of the valve 4 within it (see, in this regard, FIGS. 4 and 5).

In other words, the valve 4 is arranged in a pass-through manner within the passage hole 9.

According to the invention, the valve 4 comprises at least one retaining end 10 of substantially widened cross-section adapted to allow the valve 4 to be fitted into the container body 2 and, at the same time, adapted to prevent the valve 4 from being pulled out of the container body 2.

According to a preferred embodiment, illustrated in the figures, the retaining end 10 has a truncated-cone conformation. Different conformations of the retaining end 10, such as truncated ball or the like, cannot however be ruled out.

For this purpose, the retaining end 10 has a convergent section in the direction of moving away from the clamping portion 5.

In fact, the increasing thickness along the aforementioned direction of moving away allows the flexible portion 11 to be deformed and the passage hole 9 to be progressively enlarged, thus allowing the passage through it of the retaining end 10 and, therefore, the valve 4 to be fitted into the container body 2.

At the same time, this precise conformation prevents the opposite movement, i.e., the passage of the retaining end 10 through the passage hole 9 as a result of the fitting of the valve 4 into the container body 2.

Through the specific conformation of the retaining end 10 it is, therefore, possible to avert any attempts to remove the valve 4 from the container body 2, complying with the current regulations previously mentioned.

Going into more detail, it should be explained that the valve 4 is movable along the axis A between:

a pressurization position, wherein the clamping portion 5 is coupled to the port 3 and the retaining end 10 is spaced apart from the flexible portion 11 (FIG. 4); and a safety position, wherein the clamping portion 5 is uncoupled from the port 3 and the retaining end 10 is arranged to stop against the flexible portion 11 (FIG. 5).

During the normal use of the cylinder 1, the valve 4 is placed in the pressurization position, thus preventing gas leakage through the port 3 and allowing only gas delivery through the cavity 6*a* due to the movement of the spool 7.

On the other hand, in the event of damage to the cylinder 1 or attempts to tamper therewith, the valve 4 automatically places itself in the safety position, thus remaining firmly anchored to the retaining body 8 and being, in doing so, substantially immovable from the container body 2.

According to the invention, the cylinder 1 comprises venting means 12 associated with the valve 4 and adapted to allow the escape of the gases contained in the container body 2 when the valve 4 is in the safety position.

Advantageously, the venting means 12 comprise at least one unthreaded stretch 13 formed on the valve 4 between the clamping portion 5 and the retaining end 10, with a smaller diameter than that of the clamping portion 5.

Specifically, in the safety position, the unthreaded stretch 13 is positioned where the port 3 is located and defines, with the walls of the latter, a perimeter space S adapted to allow the gases to escape from the container body 2 (see, in this regard, the magnified view in FIG. 5).

This expedient proves particularly convenient and makes it possible, in particular, to fix the related problems of the prior art previously complained of.

In fact, as already anticipated, damage to the cylinder 1 or an attempt to tamper with the valve 4 causes the valve to be displaced from the pressurization position to the safety position.

Under this circumstance, should there be a certain amount of pressurized gas in the container body 2, the gas could immediately and effectively escape from the container body itself by crossing the perimeter space S, thus bringing the container body 2 to ambient pressure.

In actual facts, in the event of a road accident and consequent damage to the cylinder 1, the technical expedient in question makes it possible to prevent the valve 4 from escaping from the container body 2 due to the thrust exerted by the gases, keeping the latter in the safe position in order to allow the gases to escape completely.

Similarly, the venting means 12 also allow minimizing the risks to the user in case of imperfect coupling between the port 3 and the clamping portion 5.

This circumstance, too, involves, in fact, placing the valve 4 in the safety position, thus allowing the gases to flow through the perimeter space S to the outside and thus bringing the container body 2 to a pressure substantially equal to the ambient pressure.

Finally, as far as the disposal cycle is concerned, it is possible to minimize the risks to the attendant staff by simply placing the valve 4 to the safety position and thus venting the gases contained in the container body 2 to the outside, returning the latter to ambient pressure.

It should be noted that according to the preferred embodiment, shown in the figures, the threaded stretch 13 is completely threadless, therefore provided with a completely "smooth" surface.

Alternative embodiments are however considered technically equivalent wherein the unthreaded stretch 13 is partly provided with a threading interrupted by means of at least one longitudinal groove adapted to allow the gas to escape.

Conveniently, at least one of either the clamping portion 5 or the unthreaded stretch 13 has a substantially right-cylinder conformation.

Preferably, both the clamping portion 5 and the unthreaded stretch 13 have a substantially right-cylinder conformation.

Figure 3:
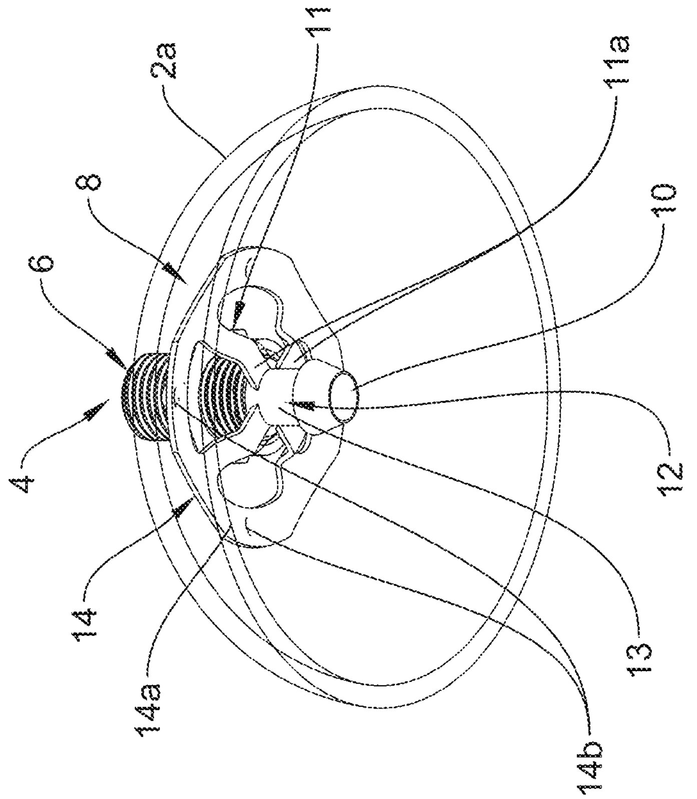
FIG. 3 is an axonometric view, from below, of the same detail as FIG. 2.
Figure 2:
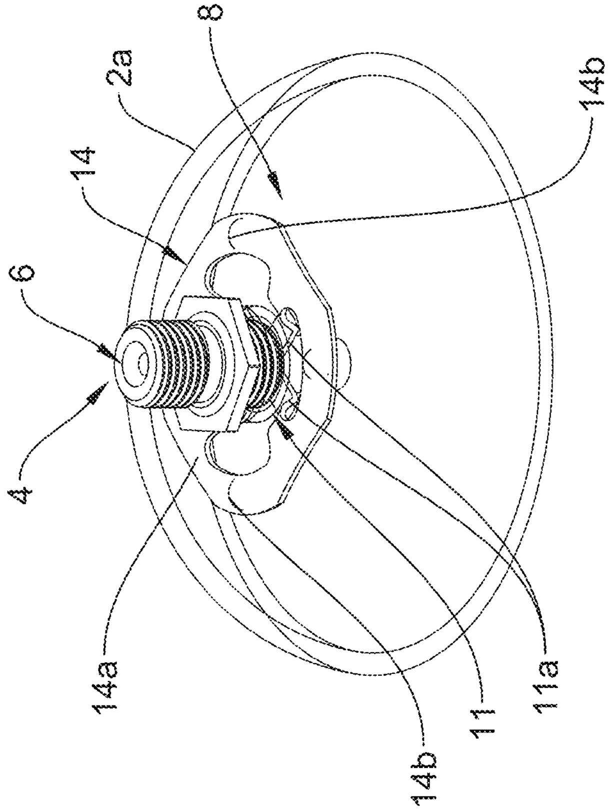
FIG. 2 is an axonometric view, from above, of a detail of the cylinder according to the invention.

Advantageously, as visible in FIGS. 2 and 3, the flexible portion 11 comprises a plurality of flexible elements 11*a* having elongated conformation and arranged in a radial pattern with respect to each other around the axis A.

Specifically, the flexible portion 11 comprises four flexible elements 11*a*.

The use of four flexible elements 11*a* allows, in fact, optimizing the production cycle of the cylinder 1 as well as its operating efficiency; it is easy, however, to appreciate how the number of flexible elements 11*a* may be different and, e.g., higher.

More specifically, the flexible elements 11*a* are arranged at a substantially constant angular distance from each other.

In other words, the flexible elements 11*a* are arranged at 90° to each other.

The flexibility of the flexible elements 11*a* allows them to expand elastically and, therefore, to enlarge the passage hole 9 to allow the passage of the retaining end during the insertion of the valve 4 into the container body 2.

Advantageously, the flexible elements 11*a* are made of metallic material.

In particular, the flexible elements 11*a* are made of stainless steel.

More specifically, the flexible elements 11*a* are made of ferritic stainless steel.

Specifically, the flexible elements 11*a* are made of Aisi430.

The particular choice of this material is very advantageous since it gives the flexible elements 11*a* good springback as a result of the insertion of the retaining end 10 into the passage hole 9 and reduces oxidation triggering.

The use of a different material cannot, however, be ruled out for making the flexible elements 11*a* that allow, however, the latter for adequate springback as a result of the complete insertion of the valve 4.

Conveniently, the retaining body 8 comprises at least one coupling portion 14 associated with the flexible portion 11 and adapted to enable the coupling of the retaining body 8 to the end portion 2*a* (see FIGS. 2 and 3).

Specifically, the coupling portion 14 comprises at least one base surface 14*a* and a plurality of welding protrusions 14*b* formed on the base surface 14*a* and arranged in a radial pattern around the axis A.

Specifically, the coupling portion 14 comprises four welding protrusions 14*b*.

As visible in the aforementioned figures, the welding protrusions 14*b* are arranged at a constant angular distance from each other.

The presence of the welding protrusions 14*b* allows the retaining body 8 to be attached to the end portion 2*a* by means of projection welding, making a particularly firm and durable coupling between the two.

It has in practice been ascertained that the described invention achieves the intended objects.

In particular, the fact is emphasized that the special arrangement of the retaining means ensures that it is impossible to tamper with them and, therefore, to remove the valve from the container body.

In addition, the special expedient of providing venting means allows the gas content of the container body to be removed easily and effectively, thus minimizing the risks to the user and to the operators involved in the cylinder disposal.

The invention claimed is:

1. A non-refillable cylinder, comprising:

at least one hollow container body adapted to contain pressurized gas and provided with at least one end portion on which at least one port for the gas outlet is obtained;

at least one one-way valve associated with said container body, adapted to allow the gas to escape from said container body and provided with at least one threaded clamping portion coupleable to said port in a threaded manner;

retaining means associated with said container body and adapted to prevent said valve from being removed from said container body;

wherein:

said retaining means comprise at least one retaining body arranged internally to said container body where said port is located and comprising at least one flexible portion defining a passage hole aligned with said port along an axis and adapted to house a stretch of said valve within it;

said valve comprises at least one retaining end of substantially widened conformation, adapted to allow said valve to be fitted into said container body and adapted to prevent said valve from being pulled out of said container body, said valve being movable along said axis between a pressurization position, wherein said clamping portion is coupled to said port and said retaining end is spaced apart from said flexible portion, and a safety position, wherein said clamping portion is uncoupled from said port and said retaining end is arranged to stop against said flexible portion;

and wherein said cylinder comprises venting means adapted to allow the escape of the gases contained in said container body when said valve is in said safety position.

2. The cylinder according to claim 1, wherein:

said venting means comprise at least one unthreaded stretch formed on said valve between said clamping portion and said retaining end, having a smaller diameter than that of said clamping portion; and by the fact that in said safety position, said unthreaded stretch is positioned where said port is located and defines with the walls of the latter a perimeter space adapted to allow the gases to escape from said container body.

3. The cylinder according to claim 2, wherein said retaining end has a convergent section in the direction of moving away from said clamping portion.

4. The cylinder according to claim 3, wherein said retaining end has a substantially truncated-cone conformation.

5. The cylinder according to claim 1, wherein said flexible portion comprises a plurality of flexible elements having elongated conformation and arranged in a radial pattern with respect to each other around said axis.

6. The cylinder according to claim 5, wherein the cylinder comprises four of said flexible elements.

7. The cylinder according to claim 5, wherein said flexible elements are arranged at a substantially constant angular distance from each other.

8. The cylinder according to claim 5, wherein said flexible elements are made of metallic material.

9. The cylinder according to claim 1, wherein said retaining body comprises at least one coupling portion associated with said flexible portion and adapted to enable the coupling of said retaining body to said end portion.

10. The cylinder according to claim 9, wherein said coupling portion comprises at least one base surface with which said flexible elements are associated and a plurality of welding protrusions formed on said base surface and arranged in a radial pattern around said axis.

* * * * *